Dec. 20, 1932.    O. A. WHEELER    1,891,789
TIRE RECLAIMING MACHINE
Filed Oct. 13, 1930    4 Sheets-Sheet 1

Omer A. Wheeler
INVENTOR

ATTORNEY

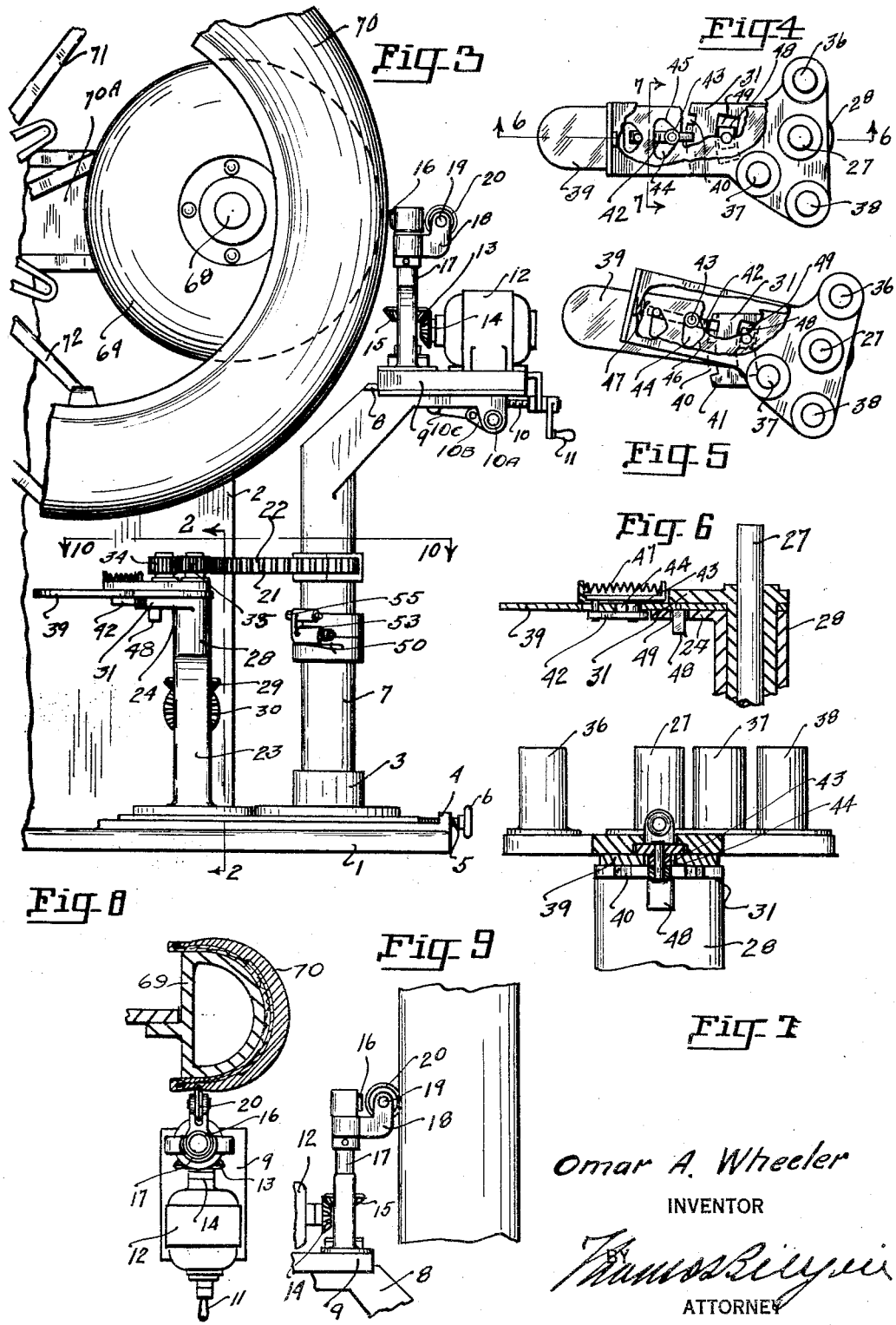

Dec. 20, 1932.  O. A. WHEELER  1,891,789
TIRE RECLAIMING MACHINE
Filed Oct. 13, 1930  4 Sheets-Sheet 3
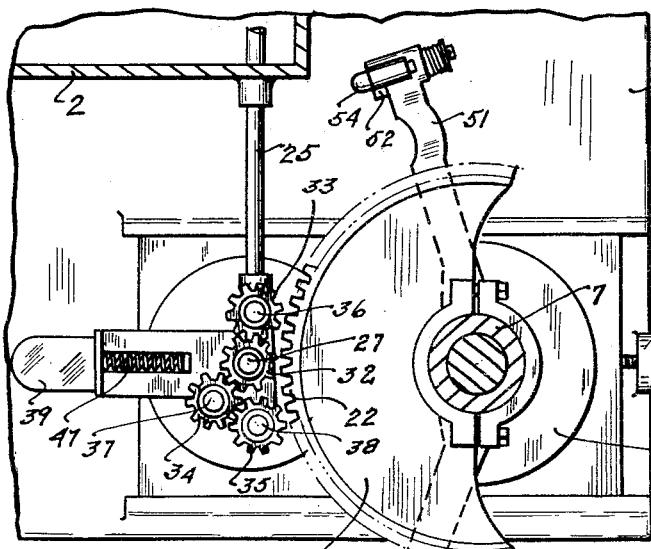
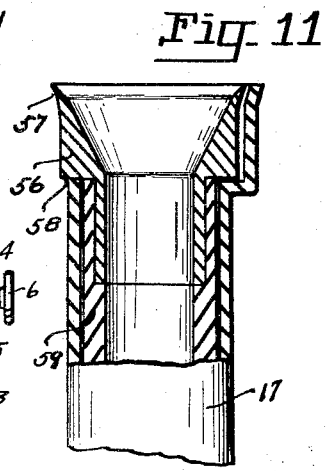
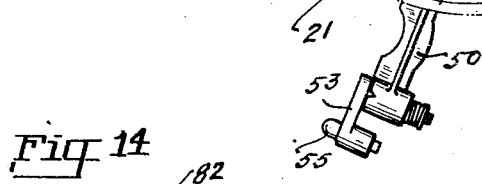
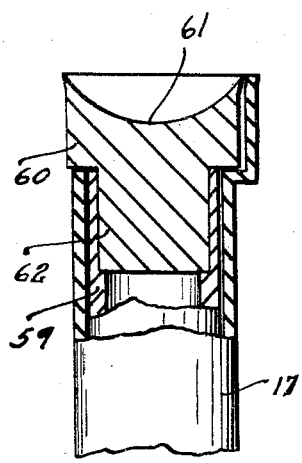
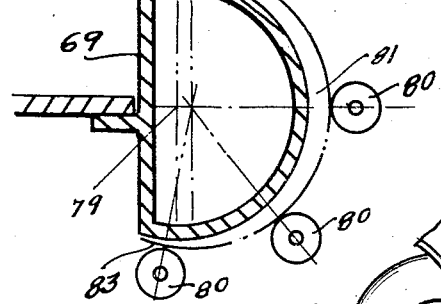
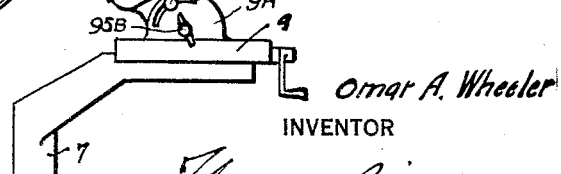
Omar A. Wheeler
INVENTOR
ATTORNEY Dec. 20, 1932.  O. A. WHEELER  1,891,789
TIRE RECLAIMING MACHINE
Filed Oct. 13, 1930  4 Sheets-Sheet 4
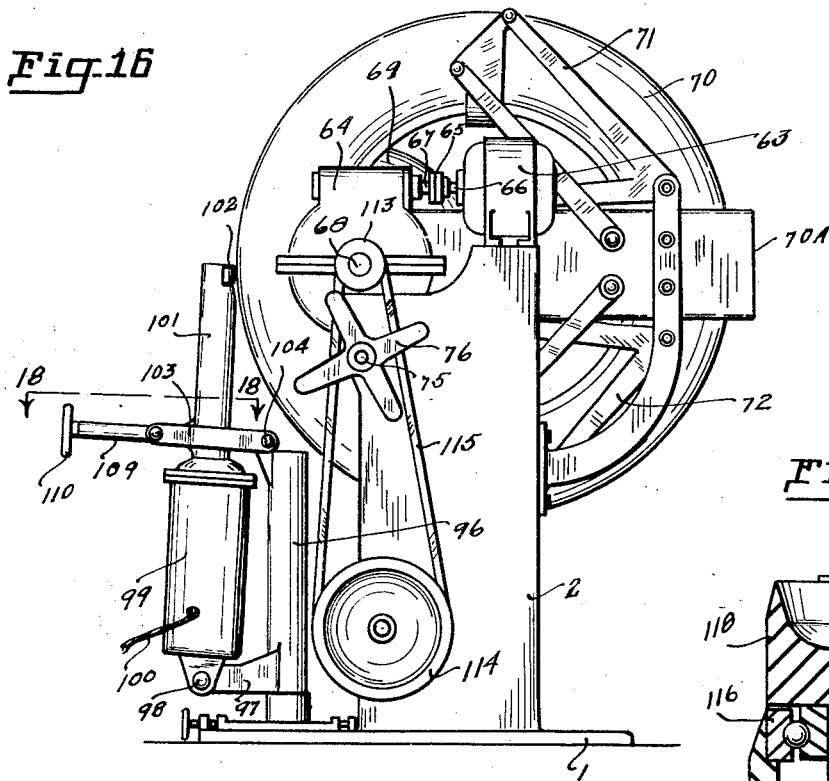
Omar A. Wheeler
INVENTOR
ATTORNEY Patented Dec. 20, 1932

1,891,789

UNITED STATES PATENT OFFICE

OMAR A. WHEELER, OF PORTLAND, OREGON

TIRE RECLAIMING MACHINE

Application filed October 13, 1930. Serial No. 488,416.

My invention relates to machines for reclaiming tire carcasses, removing the rubber from the tire and, if desired, removing the bead from the tire.

This United States patent application relates to my pending United States application, Serial Number 367,481, filed May 31, 1929, upon an improvement in a tire carcass and rubber reclaiming machine.

The invention consists primarily of a power driven tire supporting head upon which the tire to be treated is placed. A power driven cutter head is associated with the head and is capable of adjustment relative to the tire to be treated so that the most effective cutting position may be obtained. The cut portions of the tire may be either delivered through the cutter head tangential to the cutting surface that removes the ribbon from the tread of the tire or flexed over the opposite side of the cutter. Both cutter head and the tire supporting head are adapted for being adjusted to the tire to be treated.

An abrasive wheel adapted for being manually positioned is carried adjacent the cutter head whose primary function is to sharpen the cutter head while in operation.

Settable means are also provided for feathering off that portion of the tire carcass which is adjacent the bead when it is desired to make boots, or tire reliners.

Manually settable means are also provided for manipulating the cutter head automatically from side to side. Automatic means are provided for stopping the cutter head when a predetermined position is reached by the cutter head in its travel.

The primary object of my invention is to reclaim the tire carcass and place it in useable condition for retreading or for manufacturing reliners and boots from the tire carcass.

A further object of my invention consists in reclaiming the tread portion of the tire and making rubber ribbons of uniform thickness and quality.

A further object of my invention consists in providing a device that may be used for reclaiming the tread portion of the tire and for removing of the bead from the tire in a single continuous operation.

A still further object of my invention consists in providing a machine that may be used for reclaiming tires of varying diameters and of varying widths.

A still further object of my invention consists in providing a cutter head that may be sharpened or reconditioned when in actual use in the detreading of a tire.

A still further object of my invention consists in providing a cutter head that may be used in passing the cut ribbon through the cutter head, or tangential therethrough.

Another object of my invention consists in providing a cutter head for the removal of the tread portion of the tire that may be operated to the right or to the left with equal facility and one that may be automatically stopped when the end of the cut has been reached.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is a fragmentary, side elevation of the tire carcass supporting means and of the cutter head assembly and disclosed in accordance with the invention, parts being broken away and sectioned for clearness of illustration.

Fig. 4 is a top, plan view, partially in section, of the manually settable feed mechanism for the cutter head assembly in neutral position.

Fig. 5 is a top, plan view, partially in section of the mechanism illustrated in Fig. 4 illustrated in position for driving the cutter head to the right.

Fig. 6 is a sectional, side view of the mechanism illustrated in Figs. 4 and 5, taken on line 6—6 of Fig. 4, looking in the direction indicated.

Fig. 7 is a sectional, end view of the mechanism illustrated in Fig. 4, taken on line 7—7 of Fig. 4, looking in the direction indicated.

Fig. 8 is a sectional, side view, of the tire carcass and holder illustrating the cutter head at right angles to the base of the tire carcass and in position for removing the bead from the tire carcass.

Fig. 9 is a fragmentary side view of the mechanism illustrated in Fig. 8.

Fig. 10 is a sectional, top, plan view, of the cutter head column, the gear segment and the feed mechanism, taken on line 10—10 of Fig. 3, looking in the direction indicated.

Fig. 11 is a fragmentary, sectional, side view of one of the cutter heads that may be used with my tire carcass support and the drive therefor, the cutter being of the hollow type, to permit the cut ribbon to pass through the cutter head and spindle.

Fig. 12 is a fragmentary, sectional, side view of a hollow spindle having a modified form of head disposed therein, the cutter being of the solid type to permit the cut ribbon portion to be flexed over the cutter head.

Fig. 13 is a fragmentary, side view of the tire carcass and holder illustrating the use of one of the cutter heads with a modified form of drive therefor, and showing an abrasive wheel adapted for being manually placed in engagement with the cutter head for grinding it during its operation.

Fig. 14 is a diagrammatical lay out of the tire holder and the detreaded tire with the bead removed illustrating the edges of the tire as having been feathered off by the adjusting of the cutter head to cut the edge portions of the tire by the cutting of the tire increasing amounts adjacent the edges of the tire to produce a reclaimed tire carcass having feathered edges.

Fig. 15 is a diagrammatical lay out of the tire holder and the tire carcass and illustrating the tire holder of a shape to produce a reclaimed tire carcass having feathered edges.

Fig. 16 is a side view of the assembled device showing a modified form of cutter head assembly.

Fig. 17 is a fragmentary, side view of the modified form of the cutter head support and drive shown in use in Fig. 16.

Fig. 18 is a sectional, end view of the modified cutter head and support, taken on line 18—18 of Fig. 16, looking in the direction indicated.

Fig. 19 is a fragmentary, sectional, side view of a modified form of cutter head of the solid head type shown in use in Fig. 16.

Like reference characters etc.

Figure 1:
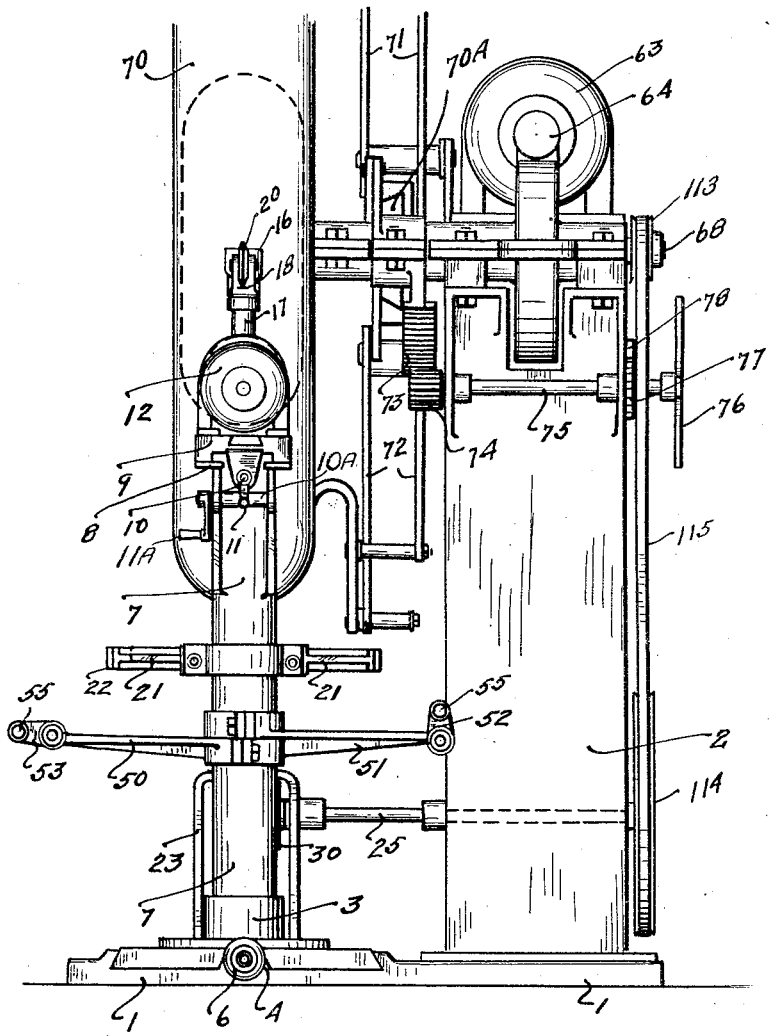
Fig. 1 is a front view of the assembled device.

I preferably form my device of a base 1 having walls 2, that form the frame for the tire carcass mechanism.

A flanged hub 3 is slidably maintained upon the base and a threaded lug 4 is disposed upon one end of the base through which a threaded shaft 5 passes. One end of the shaft is rotatably journaled to the hub 3 and a handwheel 6 is disposed upon the other end of the shaft. The cutter head column 7 is rotatably disposed within the hub 3. The main purpose of the shaft 6 is to permit the sliding of the hub 3 relative to the base and in this manner move column 7 into and away from the tire carcass so that, if desired, a feathered edge may be produced as shown diagrammatically in Fig. 14. A table 8 is secured to the upper portion of the column 7 and a cutter head base 9 is disposed upon the table and may be adjusted by any suitable adjusting means. I have shown here a threaded shaft 10 having a handle 11 secured thereto. This shaft is rotatably disposed relative to table 8 and the manipulation of the handle 11 permits a fine adjustment of the cutter head assembly which is disposed upon the table relative to the tire carcass being detreaded. A second adjusting means provided permits the quick removal of the cutter head away from the tire carcass and this adjusting means consists of a shaft 10A having a link 10B secured thereto. A handle 11A is secured to one end of the shaft 10A and link 10B is secured to the link 10C which, in turn, is journaled to the underside of the base 9. A prime mover, as an electric motor 12, is disposed upon the base 9 and provides power for the cutter head. A driving element, as a bevel gear 13, is secured to the armature shaft 14 and a similar bevel gear 15, which is secured to the shaft upon which the cutter head 16 is placed, coacts with the bevel gear 13. The cutter shaft and cutter blade assembly are maintained within the housing 17 which is vertically disposed upon the base 9.

A bracket 18 is rotatably disposed about the housing 17 and has a shaft 19 disposed therein. A cutting wheel 20 is journaled about shaft 19. To place the cutting wheel into operating position the bracket is turned 180 degrees on frame 17 and the column 7 is turned 90 degrees. The sides of driving wheel 69 serve as a backing for cutting wheel 20. The primary purpose of the cutting wheel is to provide means for cutting the bead from the tire carcass and this may be accomplished by placing the cutting wheel 20 in the position illustrated in Figs. 8 and 9 showing bracket 18 turned 180 degrees and column 7 turned 90 degrees and applying pressure by manipulating handles 11 or 11A.

A gear segment 21 having teeth 22 is fixedly disposed about the column 7. The column 7 has secured thereto arms 50 and 51, illustrated in Figs. 1 and 10 and these arms in turn have journaled thereto abutment arms 52 and 53 which are adapted for adjustment. When the abutment arms 52 and 53 are extended downwardly, the pins 54 and 55 which are disposed upon the abutment arms are in registerable alignment with the stop in 48. In Figs. 1 and 10 abutment arm 52 is shown in raised position and in direct alignment for contacting with pin 48 and abutment arm 53 is shown out of alignment with the pin 48. When it is desired to move column 7 automatically in alternating directions, both abutment arms are raised and placed in direct alignment with pin 48. When it is desired to manually move the column 7 in alternating directions both abutment arms are lowered and placed out of alignment with stop pin 48.

Figure 2:
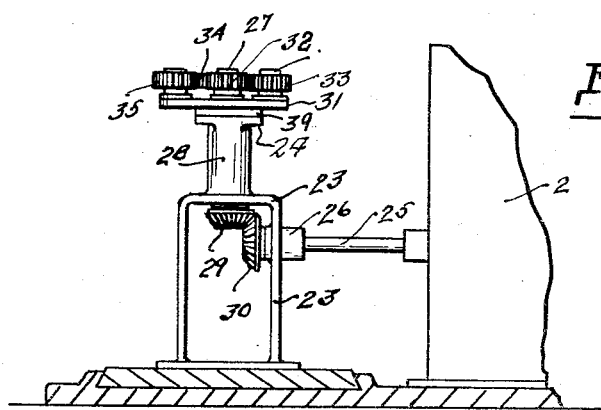
Fig. 2 is a fragmentary, sectional, side view of the manually settable feed mechanism for the cutter head assembly, the same being taken on line 2—2 of Fig. 3, looking in the direction indicated.

A column 23 is disposed upon the base 1 and a table head 24 is disposed at the top of this column. A power driven shaft 25, illustrated in Fig. 2, extends through frame 2 and is journaled within hub 26 that is a part of column 23. A driven pulley 114 is secured to one end of the shaft 25 and has gear 29 secured thereto and gears 29 and 30 coact and transmit power from shafts 25 to 27. A master gear 32 is mounted upon the upper portion of the shaft 27.

Referring to Figs. 4, 5, 6, 7 and 10, sub-base 31 carries stub shafts 36, 37 and 38. Gears 33 and 34, which are in mesh and coact at all times with gear 32, and gear 35, which is in direct alignment with gears 32 and 33, and, which is in mesh and coacts with gear 34, are carried by stub shafts 36, 37 and 38 respectively.

Before column 7 can be automatically rotated in alternating directions it is necessary that gear 33 or gear 35 come in contact with gear rack 21. This is first accomplished by moving hand lever 39 either to the right or left depending upon which one of the gears it is desired to have meshed with gear rack 21. Once one of the gears is in mesh with the gear rack, the arms 50 and 51, when they have the abutment arms 52 and 53 in raised position, will take care of changing the relationship between the gears 33 and 35 with the gear rack 21. This is accomplished by having the abutment arms strike pin 48 of the hand lever 39 and throw the entire assembly in the opposite direction to the movement of the column 7 and thereby rock gears 33 and 35 alternately into engagement with the gear rack 21.

It is obvious that when gear 33 is placed in contact with the gear rack 21, the column 7 will be rotated in one direction about the center of rotation of the axial line of the column, and when gear 35 is placed in contact with the gear rack 21, the column 7 will be rotated in the opposite direction about the center of rotation of the axial line of the column.

A hand lever 39 is disposed about the shaft 27 and is adapted for being rotated thereabout. Stop teeth 40 are disposed within the outer end 41 of the sub-base 31. A locking latch 42 is in registerable alignment and is adapted for engagement with stop teeth 40. The locking latch 42 has a pin 43 extending upwardly therefrom. A triangular shaped slot 44 is disposed through hand lever 39. Pin 43 is adapted to ride upon the sloping surfaces 45 and 46 of the triangular shaped slot. When the pin 43 rides upon either one of the sloping surfaces, the locking latch is disengaged from the teeth 40. When the pin 43 is between the sloping surfaces 45 and 46, the locking latch is in the center of the stop teeth 40 and neither one of the gears 33 nor 35 are in engagement with the teeth of the gear rack 21. When the pin 43 is riding upon sloping surfaces 45 then the gear 33 is in mesh with the teeth of the gear rack 21, and when pin 43 is riding upon the sloping surface 46, then gear 35 is in mesh with the gear rack 21. A reacting element 47 normally maintains the locking latch in contact with the stop teeth 40. A pin 48 extends downwardly from the hand lever 39 and is disposed in arcuate slots 49 which are disposed through table head 24 and sub-base 31.

I have found best results can be obtained in most detreading operations when the cutter head is made as illustrated in Fig. 11 wherein the cutter blade 56 has its maximum diameter at its peripheral cutting edge 57. A shoulder 58, which rests upon the driving spindle 59, and, which is intimately held and removably secured to the driving spindle, is provided within the cutter head. The cutter head and spindle are made hollow in order to permit the material being cut to pass therethrough.

In Fig. 12 is shown a modified form of cutter head which is adapted for use with certain classes of rubber productions and in making heavier cuts. This cutter head 60 is made solid and has a concave surface 61 formed therein. A shank 62 is disposed at the lower end of the cutter blade and intimately contacts the driving spindle 59. This form of blade permits the flexing of the cut material over the side of the cutter blade 60.

Mounted upon frame 2 is a prime mover, as an electric motor 63, and a speed reducer 64 is adapted for being driven by the prime mover. A flexible connection 65 is secured to the armature shaft 66 and to the speed reducer shaft 67. The driven shaft 68 passes through the sides of the speed reducer and has a driving wheel 69 mounted upon one of its extended ends. This driving wheel 69 acts as a drive for the tire 70. A driving pulley 113 is secured to the oppositely extended end of the driven shaft 68. A head 70A, mounted at one side of the frame 2, is movable horizontally relative to the frame and a plurality of spreader arms 71 and 72 are associated with the head 70A. These arms are adjustable vertically and are adapted to hold and support tires of different sizes and diameters while they are being rotated by the frictional contact of the driving wheel 69 with the inner walls of the tire. These arms are adapted to be moved toward and away from the driving wheel 69 through the manipulation of gear segment 73 which is disposed upon the drive side of the head 70A. A shaft 75 is journaled within frame 2 and has a driving pinion 74 secured thereto which is in mesh and coacts with gear segment 73. An operating wheel 76 is secured to the opposite end of the shaft 75 and a ratchet wheel 77 is mounted upon the shaft 75. A ratchet pawl 78 is disposed upon frame 2 and coacts with the ratchet wheel. This arrangement permits the maintaining of the spreader arms in fixed relation relative to the driving wheel 69, to the tire 70, and to each other. The tire mounting and support is practically similar to the mounting disclosed and fully described in my pending U. S. application for an improvement in tire carcass and rubber reclaiming machines, Serial No. 367,481, filed May 31, 1929, except that the mechanism for manipulating the tire mounting and support is different. Since this structure is fully described in the previous application the applicant does not deem it necessary to fully disclose in this application the exact structure of the tire mounting and support.

A feathered edge may be produced as shown in Fig. 14 wherein the normal center of the tire is illustrated at 79. When the cutter head 80 is moved toward the tire and the column supporting cutter head is moved away from the tire, the result produced is a tire carcass having its maximum thickness at 81 and feathered edges at 82 and 83. A feathered edge can also be produced in the manner illustrated in Fig. 15 wherein the tire carcass is placed upon the wheel 69 whose outer surface 86 has a radius which uniformly increases from a point distant from edges 87 and 88. The feathered edges shown at 89 and 90 are produced by rotating the cutter head about a true radius from the center 90A. The cutter head may be manually turned for 90 degrees on either side of the supporting wheel 69 upon which the tire carcass normally rides.

In Fig. 13 is shown a modified form of a cutter head assembly wherein quadrants 9A are disposed on the cutter head base 9. A slot 9B is disposed within each quadrant. Prime mover 95 has journal pins 95A which are disposed within the slots 9B. The position of the prime mover relative to the tire carcass 70 is determined by the position of the journal pins 95A within the slots 9B and key 95B holds the assembly in fixed position. The cutter head 94 is secured directly to the armature shaft 94A of the prime mover 95.

The cutter head may be sharpened while it is in operation by having an abrasive wheel 91 shown in Fig. 13 mounted upon a flexible support 92 and having a handle 93 extending from the support 92. The abrasive wheel 91 should be so placed relative to the cutter head as to engage with the surface 94 of the cutter head so that when the abrasive wheel 91 contacts with the rotating cutter head, it will also be rotated and will cut across the knife portion and in this manner sharpen the edge.

A modified form of cutter blade mounting and cutter blade drive is illustrated in Figs. 16, 17 and 18 wherein the column 96 has a bracket 97 extending outwardly from one side thereof and a journal pin 98 is disposed therein. A motor housing 99 having a motor therein is rockably disposed about the journal pin 98. Electric energy from a source of supply not shown is supplied through connection 100. A neck 101 extends upwardly from the motor housing through which the cutter blade spindle passes. Upon the outer end of the spindle there is disposed the cutter blade 102 of a type similar to the blades shown in Figs. 12 and 19. Links 103 and 103A are hingedly secured about a supporting pin 104 disposed at the top of column 96. A lug 105 is disposed at one side of the neck 101 and a journal pin 106 is disposed through lug 105. An adjusting arm 107 is hingedly secured about the pin 106. The links 103 and 103A are also hingedly secured about supporting journal pin 108 which is disposed within the adjusting arm 109. A fine adjustment of the cutter head relative to the tire carcass 70 may be accomplished through the manipulation of the hand wheel 110 which has a threaded stem 111 disposed within the arm 109 and plunger 112. The plunger is secured to adjusting arm 107.

In Fig. 19 there is illustrated a modified form of cutter head which is adapted for extremely heavy duty wherein bearing 116 is disposed between the spindle 117 and the cutter head 118.

While the form of mechanism herein shown and described is admirably adapted to fulfill the objects primarily stated, it is to be understood that it is not intended to confine the invention to the forms of embodiment herein shown and described, as it is susceptible of embodiment in various forms, all coming within the scope of the claims which follow.

What I claim is:

1. In a device of the class described, the combination of a base, a column upwardly extending from the base and partially rotatable relative to the base, a table disposed upon the column, a cutter head base slidably disposed upon the table, a cutter head frame secured to the table, a cutter head disposed within the frame, a prime mover disposed upon the table, coacting gears disposed between the prime mover and the cutter head, a gear rack disposed upon the column, a secondary column disposed upon the base, a sub-base supporting the column, gears mounted upon journals associated with the sub-base, said gears adapted for coacting with the gear rack, and means for disengaging one of the gears and for engaging the other of the gears with the gear rack, to predetermine the direction of rotation of the column carrying the cutter head about a vertical axis.

2. In a device of the class described, the combination of a base, a cutter head carrying column, rotatably disposed relative to the base and upwardly extending therefrom, a table disposed upon the column and means for adjusting the table in a horizontal plane relative to the column, a cutter head frame secured to the base, a hollow spindle rotatably disposed within the frame, a cutter head removably secured to the spindle, a prime mover mounted upon the table and adapted for driving the cutter head through coacting gears, a gear rack disposed upon the column, and power driven means for automatically rotating the cutter head carrying column first in one direction and then in the other.

3. In a device of the class described, the combination of a base, a cutter head carrying column rotatably disposed relative to the base and upwardly extending therefrom, an adjustable table disposed upon the column, a cutter head carrying frame removably secured to the table, means mounted upon the table for driving the cutter head disposed within the cutter head frame, a secondary column disposed upon the base and settable means disposed upon both of the columns for automatically and partially rotating the cutter head carrying column in alternate directions about its vertical axis.

4. In a device of the class described, the combination of a base, a frame disposed upon the base, a tire holder adjustably positionable upon the frame, means for locking the tire holder in placed position, a column upwardly extending from the base, a table adjustably positionable upon the column, a cutter head and a cutter wheel disposed within a frame secured to the adjustable table, means for oscillating the cutter head in alternate directions to detread a tire surface when the tire is rotated past the cutter head.

5. In a device of the class described, the combination of a column, a driving shaft disposed upon the column, a cutter head removably disposed upon the upper portion of the driving shaft, means for rotating the shaft and the cutter head, selective means for moving the cutter head horizontally toward and away from the field of operation, and selective means for moving the column in the arc of a circle relative to the field of operation.

6. In a device of the class described, the combination of a column, means for moving the column longitudinally, cutting means disposed upon the column, power means for driving the cutting means, means for moving the cutting means toward and away from the field of operation, means for supporting a tire so that the radial center of its cross section coincides with the center of movement of the column, means for locking the tire support, means for moving the column in the arc of a circle relative to the tire supporting means, and means for driving the tire past the cutting means.

7. In a device of the class described, in combination with an adjustable mounting frame adapted to rotatably support a tire with its axis horizontal, a base, means for moving the base, a column vertically positioned on the base so that it is aligned with the radial center of the arc of a circle made by a horizontal cross section through the axis of the tire, cutting means disposed upon the column, selective means for moving the cutting means horizontally toward and away from the tire, means for rotating the cutting means disposed upon the column, and means for moving the support in the arc of a circle relative to the tire mounting frame.

8. In a device of the class described, the combination of a base, manual means for moving the base, a column rotatably disposed upon the base, cutting means disposed upon the column, power means for rotating the cutting means, selective means for horizontally moving the cutting means, a gear rack secured to the column, a secondary column disposed parallel to the first mentioned column, a plurality of gears disposed upon the secondary column, means for alternately engaging and disengaging one of two gears with the gear rack, and mechanical means disposed upon the first mentioned column for automatically changing the direction of rotation of said first mentioned column.

9. Apparatus as specified in claim 8 wherein the cutting means includes a hollow shaft and a hollow cutter head blade disposed therein.

10. Apparatus as specified in claim 8 wherein the cutter means has associated therewith a rotatably disposed cutting wheel which is adapted to cut the tread of a tire.

11. Apparatus as specified in claim 8 wherein the mechanical means for automatically changing the rotation of the first mentioned column comprises a pair of arms extending outwardly from the first mentioned column, and a pair of abutment arms associated with said arms.

12. Apparatus as in claim 8 characterized by a lug downwardly disposed from the secondary column and adapted to contact with the mechanical means for changing the direction of rotation of the first mentioned column.

13. Means to be used with a device of the class described, including a cutter head rotatably mounted upon a secondary column vertically disposed and parallel to the cutter head assembly column, a shaft disposed therein removably secured at its upper end to the cutter head, a master gear secured to the shaft, a support secured to the secondary column, a plurality of gears disposed upon the support, means for driving the shaft and means for alternately meshing some of the gears with the cutter head assembly.

14. Apparatus as in claim 13 characterized by manual means for engaging and disengaging the gears with the gear rack of the cutter head assembly.

OMAR A. WHEELER.